Nov. 28, 1944. J. A. MacKAY ET AL 2,364,036
METHOD AND APPARATUS FOR MAKING SPONGE
RUBBER CUSHIONS OR LIKE ARTICLES.
Filed Aug. 14, 1941 6 Sheets-Sheet 2
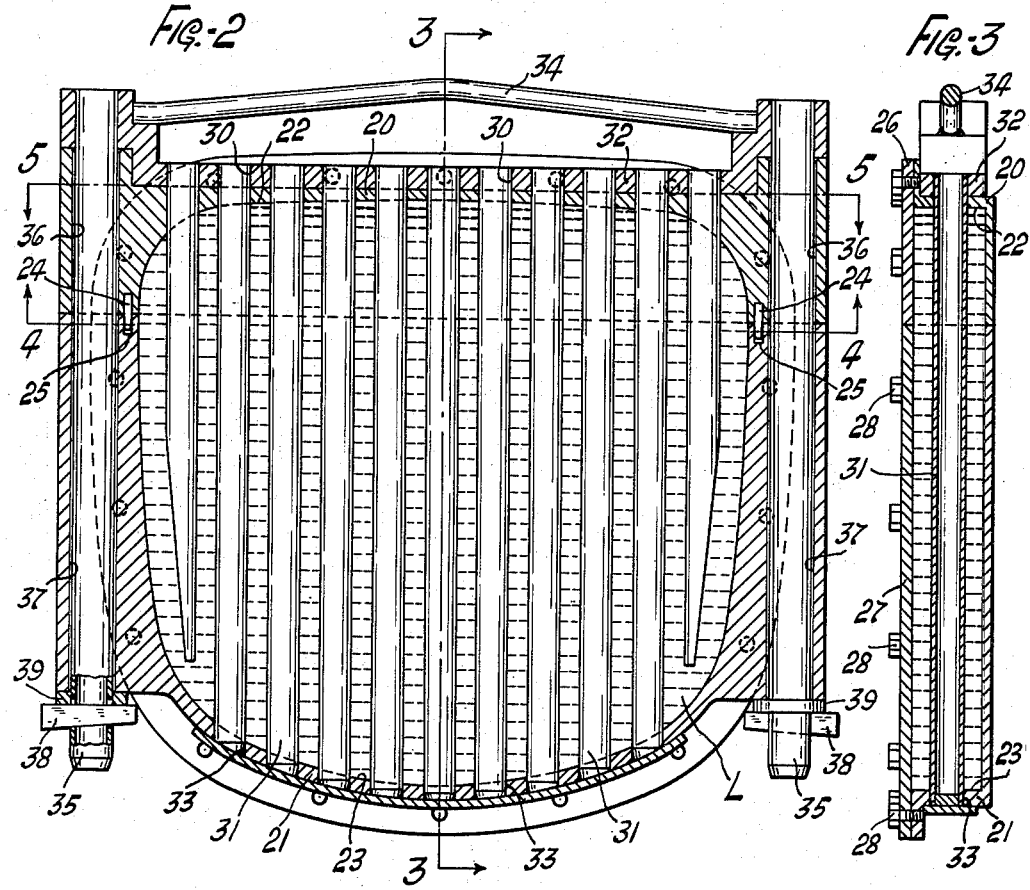
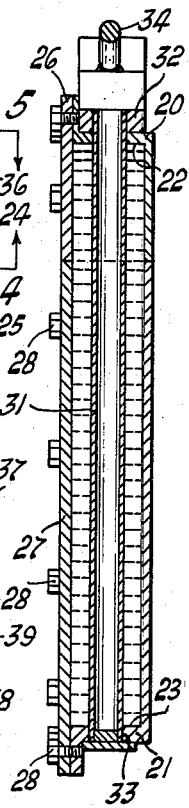
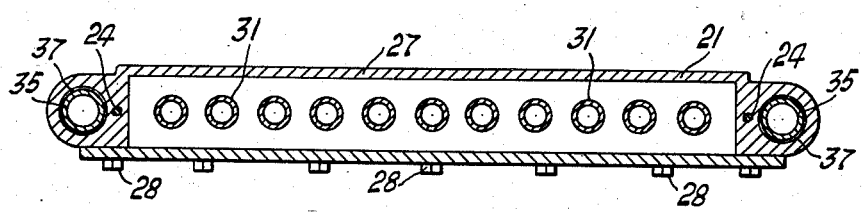
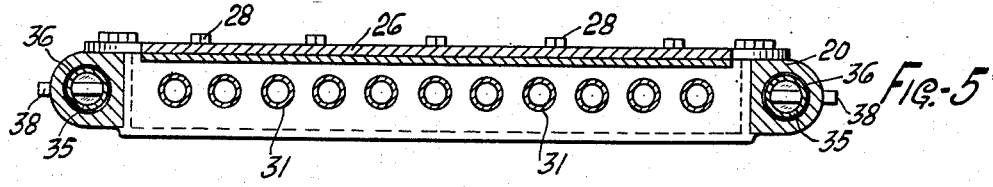
INVENTORS
JOHN A. MacKAY
CHARLES H. NAGEL
BY Ralph Barrow Nov. 28, 1944. J. A. MacKAY ET AL 2,364,036
METHOD AND APPARATUS FOR MAKING SPONGE
RUBBER CUSHIONS OR LIKE ARTICLES
Filed Aug. 14, 1941 6 Sheets-Sheet 3
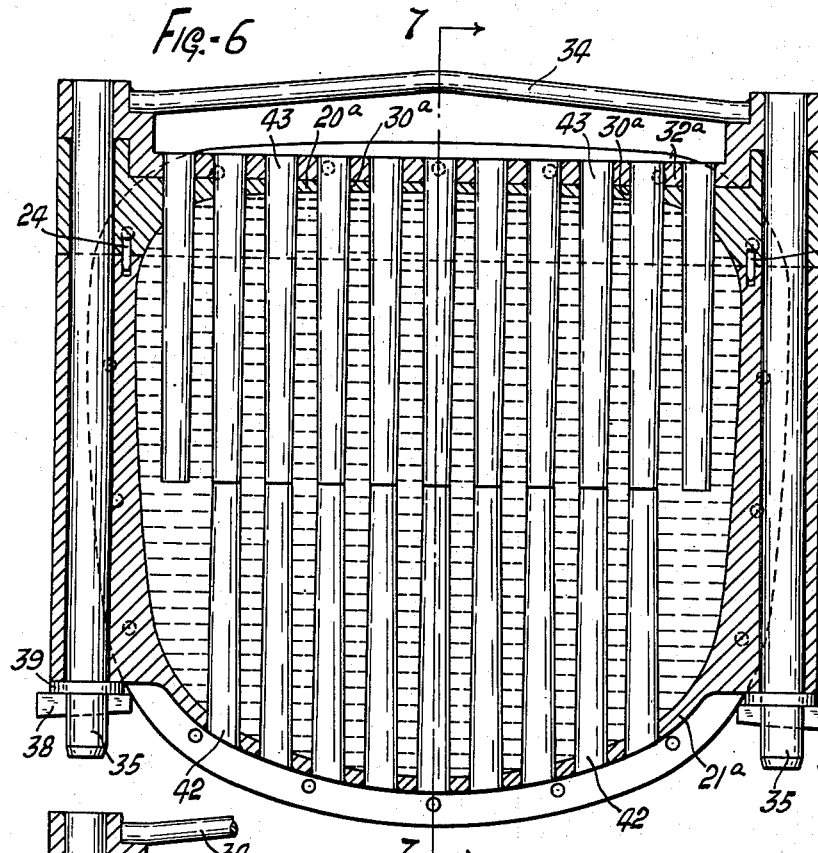
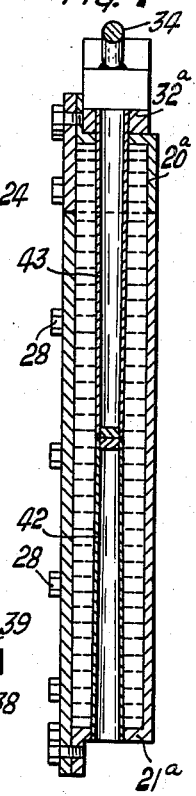
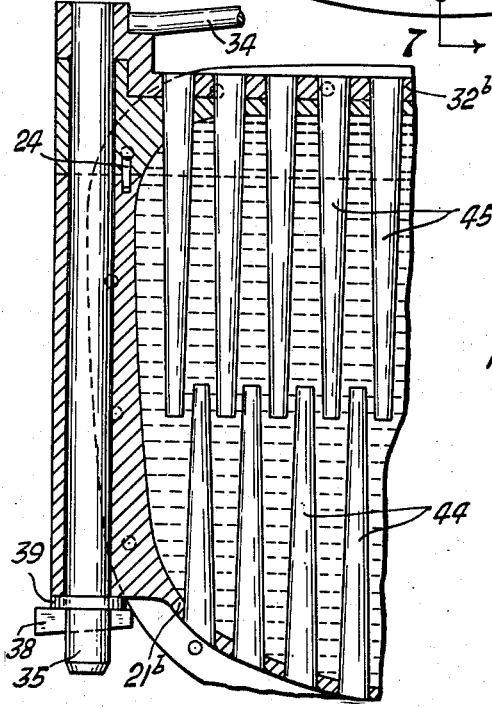
INVENTORS
JOHN A. MacKAY
CHARLES H. NAGEL
BY
J Ralph Barrow

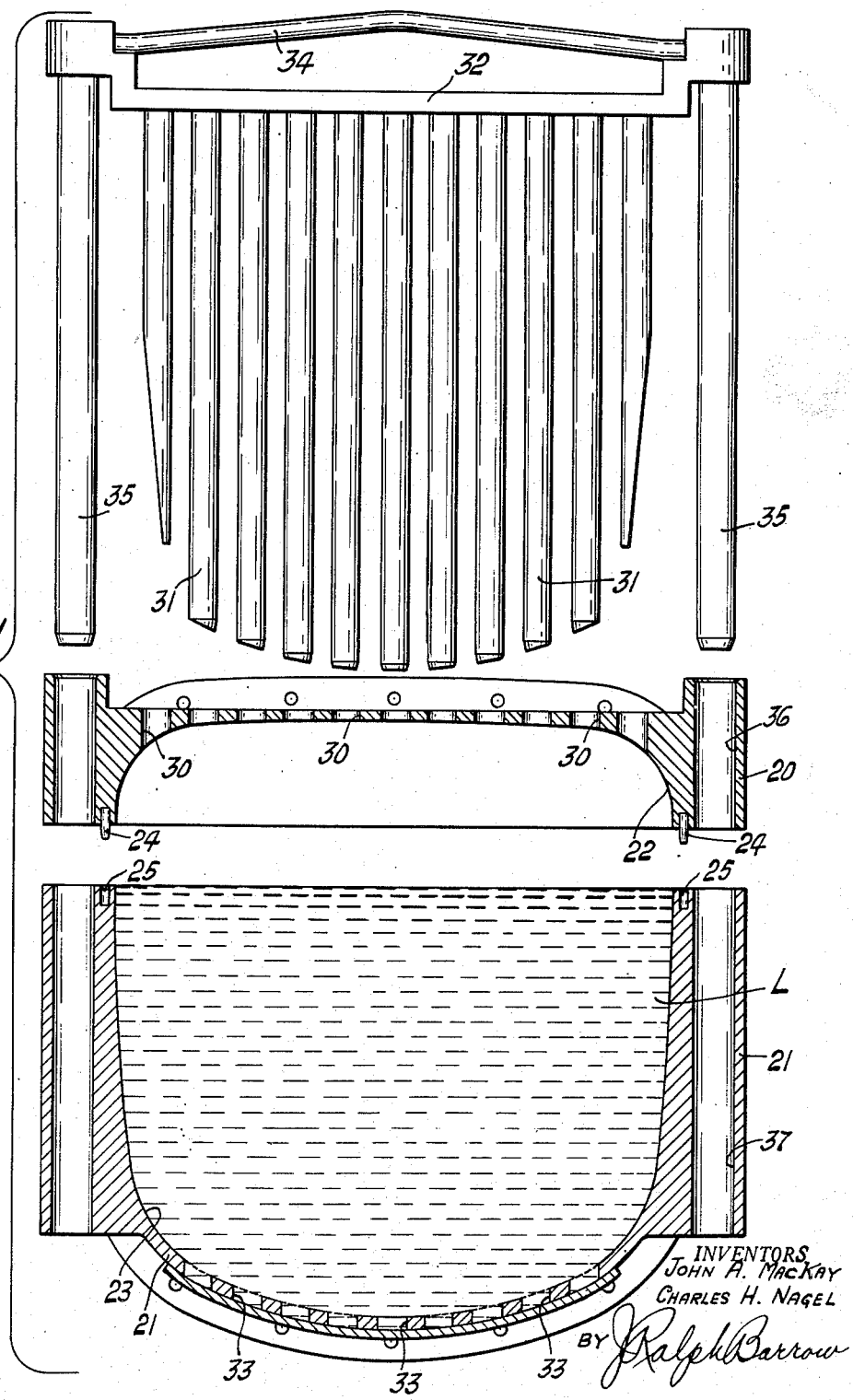

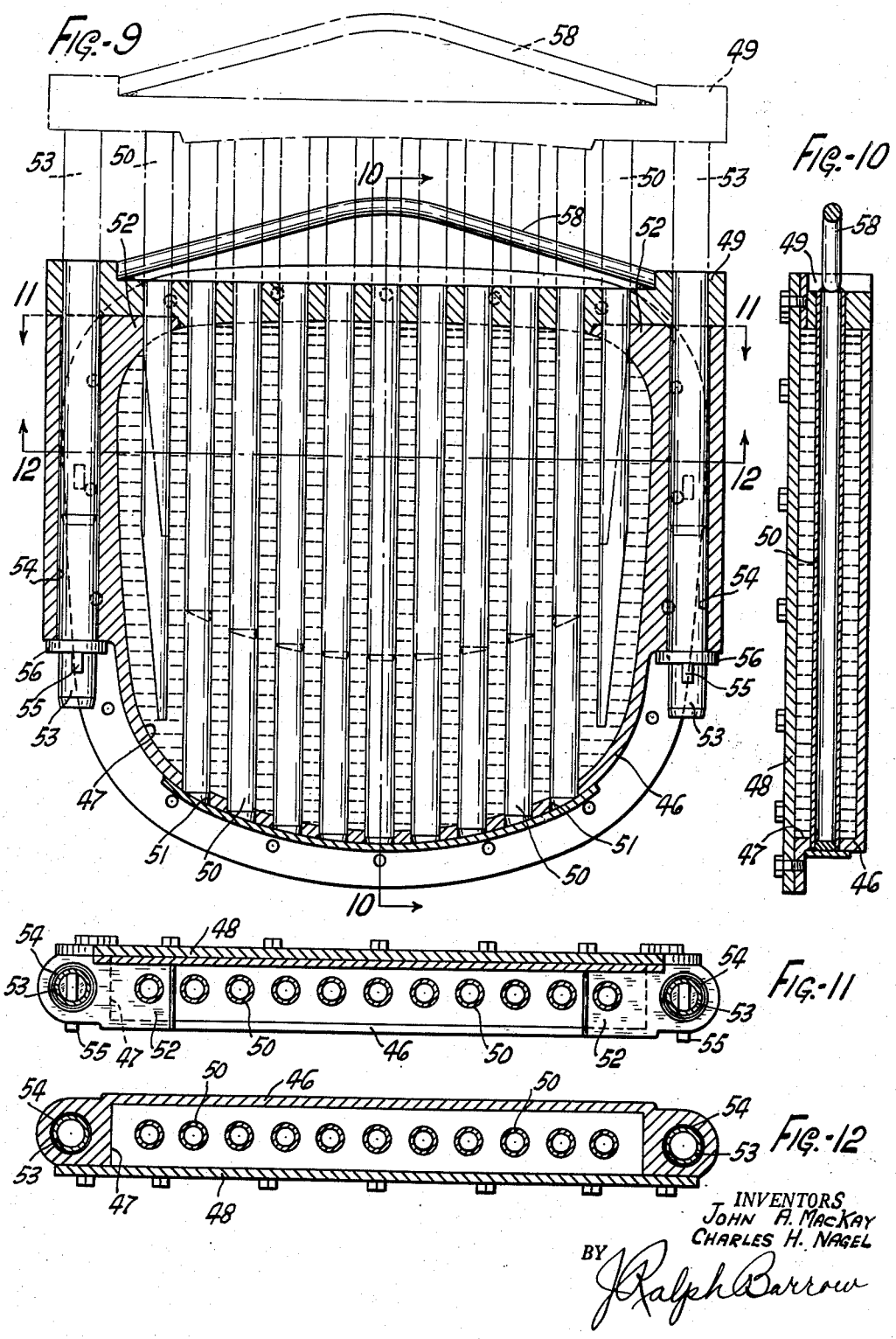

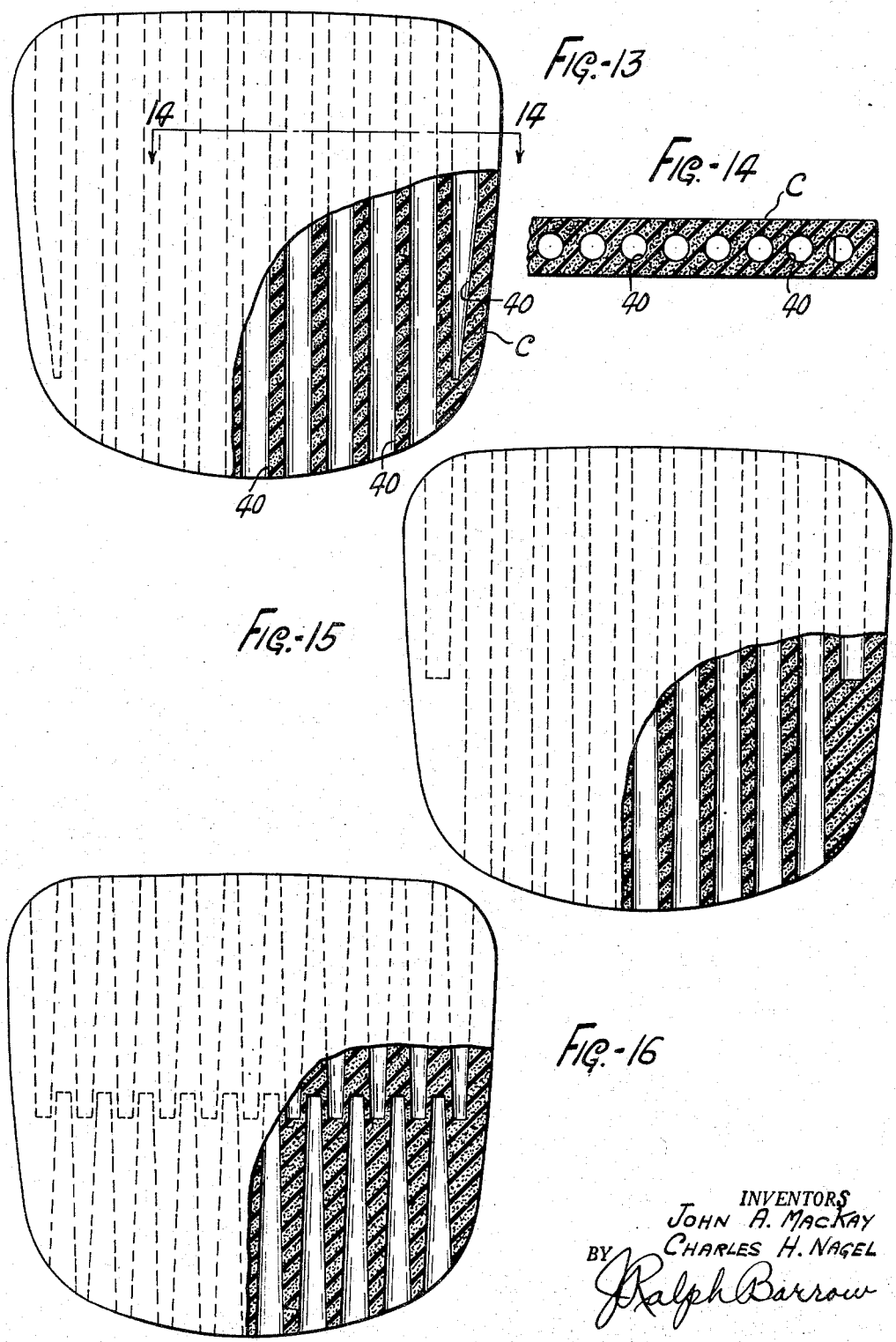

Nov. 28, 1944.  J. A. MacKAY ET AL  2,364,036
METHOD AND APPARATUS FOR MAKING SPONGE
RUBBER CUSHIONS OR LIKE ARTICLES
Filed Aug. 14, 1941     6 Sheets-Sheet 6
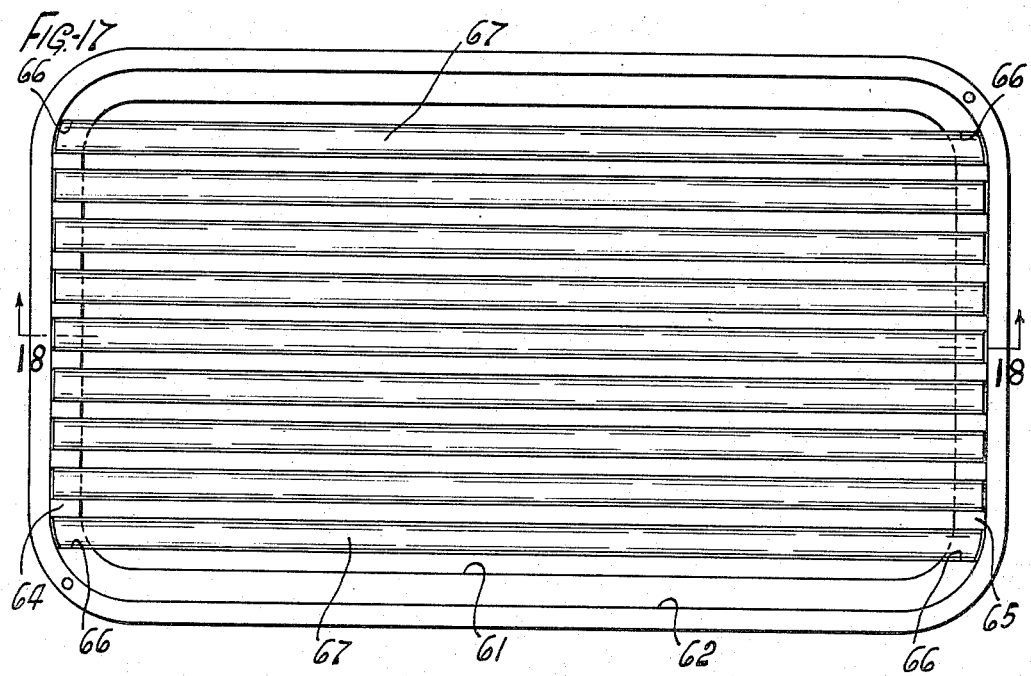
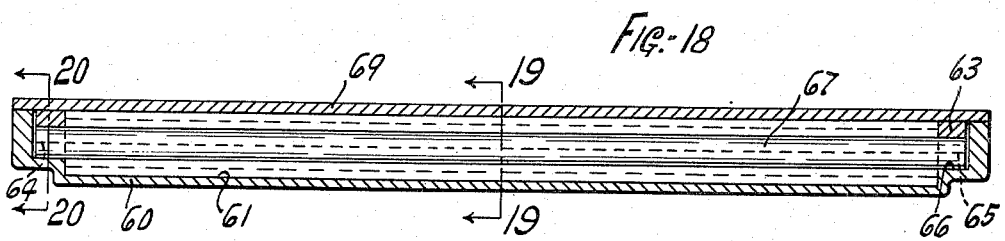
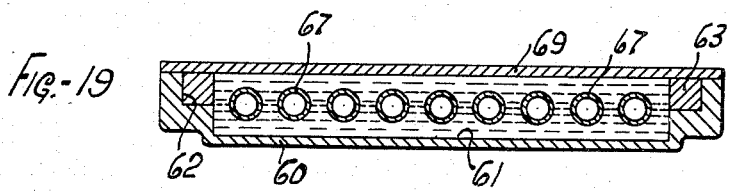
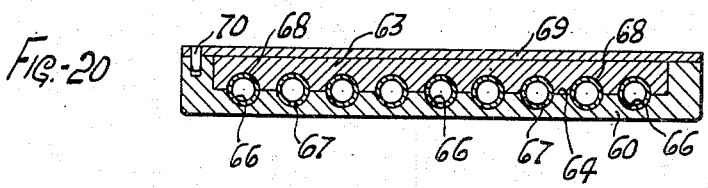
INVENTORS
JOHN A. MacKAY
CHARLES H. NAGEL
BY
J. Ralph Barrow Patented Nov. 28, 1944

2,364,036

UNITED STATES PATENT OFFICE 2,364,036

METHOD AND APPARATUS FOR MAKING SPONGE RUBBER CUSHIONS OR LIKE ARTICLES

John A. MacKay, Barberton, and Charles H. Nagel, Akron, Ohio, assignors to The Sun Rubber Company, Barberton, Ohio, a corporation of Ohio Application August 14, 1941, Serial No. 406,812

7 Claims. (Cl. 18—39)

This invention relates to methods and apparatus for manufacturing sponge rubber seat cushions, mattresses or like pads.

An object of the invention is to provide improved molds for vulcanizing sponge rubber seat cushions or like pads, which molds may be maintained in vertical planes during the process of pouring beaten latex, or chemically treated liquid rubber, or like compounds therein and which molds may be placed in a vulcanizing chamber in the same relative position, whereby a longitudinal series of such molds may be maintained on a rack for both the pouring and vulcanizing operations, with consequent economy of space and reduction of handling as compared with the usual vertical stacking of flat molds in horizontal planes which necessitates separating the molds for the pouring and other operations.

Another object of the invention is to provide improved molds for vulcanizing sponge rubber articles, including improved means for accurately determining how much latex or other prepared liquid compound to pour into one part of the mold in order to allow for liquid displacement by aperture-forming cores on another part of the mold.

Another object of the invention is to provide molds for vulcanizing relatively flat sponge rubber articles having cored openings extending therethrough from opposite side edges thereof, said molds having improved cores therein which facilitate removal thereof from the vulcanized product.

These and other objects of the invention will be manifest from the following brief description and the accompanying drawings.

Of the accompanying drawings:

Figure 1 is a vertical explosion view, partly in cross-section, of a three part mold embodying the invention, illustrating the construction and relative arrangements of the parts as they are assembled.

Figure 2 is a vertical cross-section through the same mold but in assembled relation.

Figure 3 is a vertical cross-section taken on line 3—3 of Figure 2.

Figure 4 is a horizontal cross-section taken on line 4—4 of Figure 2.

Figure 5 is a horizontal cross-section taken on line 5—5 of Figure 2.

Figure 6 is a view similar to Figure 2, illustrating a modified form of the invention.

Figure 7 is a cross-section taken on line 7—7 of Figure 6.

Figure 8 is a fragmentary cross-section similar to Figure 6, of another modified form of the invention.

Figure 9 is a view similar to Figure 2 of another modified form of the invention.

Figure 10 is a vertical cross-section taken on line 10—10 of Figure 9.

Figure 11 is a horizontal cross-section taken on line 11—11 of Figure 9.

Figure 12 is a horizontal cross-section taken substantially on line 12—12 of Figure 9.

Figure 13 is a plan view, partly broken away and in section, of a seat cushion produced in the equipment illustrated in Figures 1 to 5.

Figure 14 is a fragmentary cross-section taken on line 14—14 of Figure 13.

Figure 15 is a view, similar to Figure 13, of a seat cushion produced in the equipment illustrated in Figures 6 and 7.

Figure 16 is a view, similar to Figures 13 and 14, of a seat cushion produced in the equipment illustrated in Figure 8.

Figure 17 is a top plan view of another modified form of mold embodying the invention, with the top or cover and core-retaining frame thereof removed for greater clearness.

Figure 18 is a cross-section taken substantially at line 18—18 of Figure 17, but with all parts of the mold assembled.

Figure 19 is a cross-section taken on line 19—19 of Figure 18.

Figure 20 is a cross-section taken on line 20—20 of Figure 18.

Referring particularly to Figures 1 to 5 of the drawings, the numerals 20 and 21 designate upper and lower cavity sections of a mold adapted to be in registry whereby cavities 22 and 23 thereof will form a single closed chamber for molding a relatively flat sponge rubber or like article from liquid material the correspondingly flat chamber being in a vertical plane for purposes to be described. Dowel pins 24, 24 provided on the underside of upper section 20 are adapted to register with apertures 25 in the upper side of section 21 for centering the sections in registry. As best shown in Figures 3, 4 and 5 the relatively flat upper and lower mold sections 20 and 21 are constructed with plates 26 and 27, removably secured thereto, as by means of screws 28 to form sidewalls thereof, these plates being removable for the purpose of cleaning the cavities of the sections.

In the upper wall of section 20 may be a plurality of transversely spaced apertures 30 for receiving therethrough spaced cylindrical cores 31 on a member or head 32 which is adapted to seat on the top of upper section 20, whereby when sections 20 and 21 are in registry the cores 31 will extend vertically through the mold chamber in spaced relation to the sides thereof, the ends of the cores engaging in apertures 33 provided on the bottom wall of section 21. Slight clearance may be provided between the cores and the apertures 30 for venting the mold cavity. The ends of the cores preferably are slightly tapered, as shown, to eliminate entrapment of liquid in the apertures 33, as will be understood later. A suitable grip 34 is provided on head 32 for handling the same.

For clamping the parts 32, 20 and 21 in registering relation, the head 32 may have thereon rods 35 adapted to extend through holes 36, 36 and 37, 37 in sections 20 and 21, respectively, tapered pins 38 being forcibly insertable in openings in the lower ends of the rods to urge washers 39 thereon against under portions of the lower section to apply the desired clamping action (see Figure 2).

The volume of the cavity 23 of the lower section with respect to the total volume of the mold chamber and to the sizes of cores 31, may be such that it may be filled with beaten latex L, or other liquid rubber compound for making sponge rubber articles, up to the parting line or top edge of the lower mold section, and such that upon clamping the lower and upper sections and the head 32 together, as described, the cores 31 will displace a sufficient volume of liquid completely to fill the mold chamber. Thus the necessity of measuring a predetermined quantity of liquid into the mold is eliminated, it being only necessary to pour the liquid into the lower mold section until the level reaches the top edge of the cavity 23.

In the operation or use of the mold, the cavity 23 of the lower mold section is filled with liquid sponge rubber compound and the upper section 20 and head 32 clamped thereon in the manner described in the last paragraph, after which the assembled mold is placed in a vulcanizing chamber of known type for a sufficient period of time to set or harden the liquid into a sponge rubber article. A series of such molds may be arranged flatwise with respect to each other on a portable rack (not shown), whereby a plurality of lower mold sections may be filled with liquid rubber at the same time, and the filling, curing and article-removing processes may be carried out without necessarily removing the lower mold sections from such rack. Thus the improved construction saves space and minimizes handling of the mold parts, as well as minimizing the task of measuring the liquid rubber compound into the mold.

A sponge rubber cushion C formed in the improved mold described above is illustrated in Figures 13 and 14, there being cushioning apertures 40 therein formed by the cores 31. The apertures 40 extend between the front and back edges of the cushion so that there will be relatively softer cushioning effect at the front of the cushion to relieve pressure applied to the under portions of the legs of a person sitting on it. Because the spaced openings 40 extend through the cushion in the plane thereof the cushion is adapted to be used with either flat side up.

Figures 6 and 7 illustrate a three part mold which is substantially identical to the mold described above except with reference to the core structure, like parts otherwise being given like numerals unless otherwise stated. The core structure is designed to provide spaced openings extending between opposite edges of the finished articles, as before, but comprises spaced, outwardly tapered cores or pins 42, 42 extending outwardly from the bottom of lower section 21ª, the ends of these pins preferably being substantially inwardly of the parting line of the mold, and correspondingly spaced and tapered pins or cores 43 on the head 32ª for engaging through spaced apertures 30ª in upper mold section 20ª substantially to engage the ends thereof with the ends of cores 42. Sufficient clearance preferably is allowed between the ends of cores 42 and 43 to permit full registry of the mold sections when clamped together (see Figure 6). As before, the relative volumes of the cavities in the upper and lower sections are such that the lower cavity may be filled with liquid rubber compound to the parting line of the lower section whereby the cores 43 will displace the liquid completely to fill the mold chamber upon clamping the mold parts together. A cushion formed in the mold just described is illustrated in Figure 15. The tapered shape of pins 42 and 43 greatly facilitates removal of the vulcanized articles from the mold.

Figure 8 illustrates another three part mold which is substantially like that described in connection with Figures 6 and 7, except that tapered cores 44 and 45 extend from the bottom of lower section 21ᵇ and the head 32ᵇ, respectively, to be in staggered relation in the assembled relation of the mold parts. The ends of the staggered cores may be in slightly overlapped relation to provide requisite cushioning in the finished article produced in the mold. A seat cushion formed in the mold described is illustrated in Figure 16.

Referring to Figures 9, 10, 11 and 12 there is shown a modified type of mold for producing seat cushions similar to that shown in Figure 13. This mold comprises a mold section or member 46, substantially like the lower mold section 21 shown in Figure 1, the same having an article-forming cavity 47 therein and including a removable plate 48 forming one side wall thereof to facilitate cleaning said cavity. A head 49 is removably mounted in registering relation on the top of said member, the inner face of the head forming the top wall of the cavity, preferably in the plane of the parting line between the member 46 and the head.

Mounted on the head 49 may be a series of spaced cores 50 which extend through the cavity 47 in a plane to register the ends thereof in holes 51 in the bottom wall of the mold section 46. The cores on the ends of the series extend through inwardly directed apertured portions 52 on said mold section, which may be necessary to the design of the mold.

The head 49 may have rods 53, 53 thereon extending through holes 54, 54 in the mold section at opposite sides thereof, and tapered pins 55 are removably inserted in openings in the ends of the rods to urge washers 56 against under portions of the mold section to clamp the same and the head together. The chain-dotted lines in the upper part of Figure 9 illustrate the head partly removed from the mold section 46, a grip 58 being provided on the head for handling the same.

The two part mold described in connection with Figures 9 to 12 is adapted to be used substantially in the manner previously described in connection with three part molds, with the exception, however, that a predetermined quantity of liquid rubber compound is poured into cavity 47 in order that the cores 50 will displace a sufficient amount of liquid rubber completely to fill the mold cavity. The cavity, because of the relatively small area at the top thereof, is sufficiently vented at the parting line between mold section 46 and head 49.

Figures 17 to 20 illustrate another modified type of mold for producing a sponge rubber mattress having spaced openings extending in the plane of the mattress from opposite edge portions thereof. This mold may comprise a member or receptacle 60 having a relatively shallow article-forming cavity 61, and extending around this cavity may be a recess 62, approximately half as deep as the cavity for receiving a rectangular frame 63 the inner edge portions of which form a part of the article-forming cavity. Opposite ledges 64, 65 formed by the recess 62 may have oppositely disposed recesses 66, 66 for receiving the ends of tubular cores 59 to support the same in horizontally spaced relation, the under side of frame 63 at opposite ends thereof being provided with similar recesses 68, 68 for fitting over the ends of tubular cores 67 to permit proper seating of the frame in mold member 60 whereby the latter will hold the cores firmly in place. For closing the top opening of the mold a plate 69 may be removably mounted on top of member 60, dowels 70 being provided on the plate for properly registering the same on said member.

In the operation of the mold just described it is assembled with the cores 67 and frame 63 in place in the member 60, and the plate 69 removed. Liquid rubber compound is then poured into the cavity to the top edge of frame 63, covering the cores 67, after which the top plate 69 is put in place, as shown in Figures 18, 19 and 20. There being no displacement of the liquid rubber by the cores after pouring, there is no problem presented of measuring a predetermined volume of liquid into the mold, it being only necessary to fill the mold cavity as described. A plurality of such filled and assembled molds may be vertically stacked in a vulcanizing chamber (not shown), in which case the molds may be clamped together, to hold the parts thereof in assembled relation, by the weight of one upon the other or by other suitable pressure means (not shown) After the vulcanizing operation the plate 69 and frame 63 are removed from the mold to permit removal of the finished sponge-rubber article, the cores 59 being separately removable from said article.

Thus the mold described immediately above is capable of producing sponge rubber mattresses or pads having cushioning apertures extending therethrough between opposite ends thereof, whereby such mattresses are reversible as distinguished from mattresses having cushioning recesses on one side thereof.

Other modifications of the invention may be resorted to without departing from the spirit thereof or the scope of the appended claims.

What is claimed is:

1. Apparatus of the class described comprising registering upper and lower mold sections having cooperating article forming cavities, a male element or elements associated with said upper section for projecting into the cavity of the lower section when the sections are in registry, the cavity of said lower section being substantially of equal volume to that of cooperating cavities less the volume of the male element or elements so that upon filling the cavity in the lower section with fluid article forming material substantially to the top of the lower section, and placing said upper section in registry therewith with the associated male element or elements projecting into said cavity of the lower section, said element or elements will displace sufficient material from the lower cavity substantially to fill the cavity of the upper section.

2. Apparatus of the class described comprising registering upper and lower mold sections having cooperating article-forming cavities therein, said upper section having a plurality of apertures extending therethrough to communicate with the interior of the mold, and a member having a plurality of cores thereon removably mounted on said upper section with the cores extending through said apertures and projecting into the cavity of the lower section, the volume of the cavity of the lower section being substantially of equal volume to the volume of the cooperating cavities less the volume of said cores where they project into the mold so that by filling the lower cavity with article-forming fluid material substantially to the top of the lower section and then assembling the upper and lower sections and said core member together said cores will displace sufficient material in the lower cavity substantially to fill the cavity of the upper section.

3. Apparatus of the class described comprising registering upper and lower mold sections having cooperating article forming cavities therein, and means for releasably clamping said sections in registry, a male element or elements associated with said upper section for projecting into the cavity of the lower section when the sections are in registry, the cavity of said lower section being of volume substantially equal to that of the cooperating cavities less the volume of the male element or elements so that upon filling the cavity of the lower mold section with fluid article forming material substantially to the top of the lower section and placing said upper section in registry therewith with the male element or elements projecting into the lower cavity said element or elements will displace sufficient material from the lower cavity substantially to fill the cavity of the upper section, the clamped sections confining the material against flow from the mold.

4. Apparatus of the class described comprising registering upper and lower mold sections having cooperating article-forming cavities therein, said upper section having a plurality of apertures extending therethrough to communicate with the interior of the mold, a member having a plurality of cores thereon removably mounted on said upper section with the cores extending through said apertures and projecting into the cavity of the lower section, and means for releasably clamping said sections and said core member together, the volume of the cavity of the lower section being of a volume substantially equal to that of the cooperating cavities less the volume of the cores so that by filling the lower cavity with article-forming fluid material substantially to the top of the lower section and then assembling the upper and lower sections and said core member together said cores will displace sufficient material in the lower cavity substantially to fill the cavity of the upper section, the clamped sections of the mold confining the material against flow from the mold.

5. Apparatus of the class described comprising upper and lower mold sections for registering with each other and having cavities therein for forming a closed article-forming chamber when the sections are in registry, said upper section having a plurality of apertures in the top thereof communicating with said chamber, and a member having a plurality of cores thereon adapted to be removably mounted on said upper section with the cores projecting through said apertures to extend through said chamber to the bottom wall thereof, said lower cavity being of a volume substantially equal to that of the chamber less the volume of the cores so that by filling said lower cavity with fluid article-forming material substantially to the top of the lower section and thereafter assembling the upper and lower sections in registering relation with said core member mounted on the upper section said cores will displace sufficient material completely to fill said chamber.

6. Apparatus of the class described comprising upper and lower mold sections for registering with each other and having cavities therein for forming a closed article-forming chamber when the sections are in registry, said upper section having a plurality of apertures in the top thereof communicating with said chamber, and a member having a plurality of cores thereon adapted to be removably mounted on said upper section with the cores projecting through said apertures to extend into said chamber, said lower cavity being of a volume substantially equal to that of said chamber less the volume of the cores so that by filling said lower cavity with fluid article-forming material substantially to the top of the lower section and thereafter assembling the upper and lower sections in registering relation with said core member mounted on the upper section said cores will displace sufficient material completely to fill said chamber.

7. A method for making articles of the class described comprising filling the cavity of one section of a sectional mold having registering cavities with a predetermined amount of molding material sufficient completely to form an article desired, the cavity of said one section having a volume sufficient to hold substantially said predetermined amount of material, associating another mold section of said sectional mold with said one mold section to bring the cavities thereof into registry, said other mold section having associated therewith a core member or members having displacement volume substantially equal to the volume of said cavity of said other section.

JOHN A. MacKAY.
CHARLES H. NAGEL.